June 26, 1962        J. H. SHERTS ETAL        3,041,224
METHOD OF FORMING FOAM LAYERS ON CARPETING
Filed Feb. 28, 1956                              6 Sheets—Sheet 1

INVENTORS
JAMES HERVEY SHERTS
KEITH H. COULTRAP and
BY SAMUEL M. TERRY

Oscar H. Spencer
ATTORNEY

June 26, 1962   J. H. SHERTS ETAL   3,041,224
METHOD OF FORMING FOAM LAYERS ON CARPETING
Filed Feb. 28, 1956   6 Sheets-Sheet 2
FIG. 7
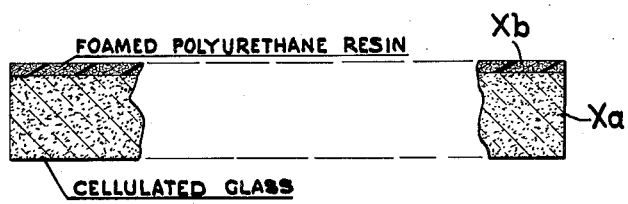
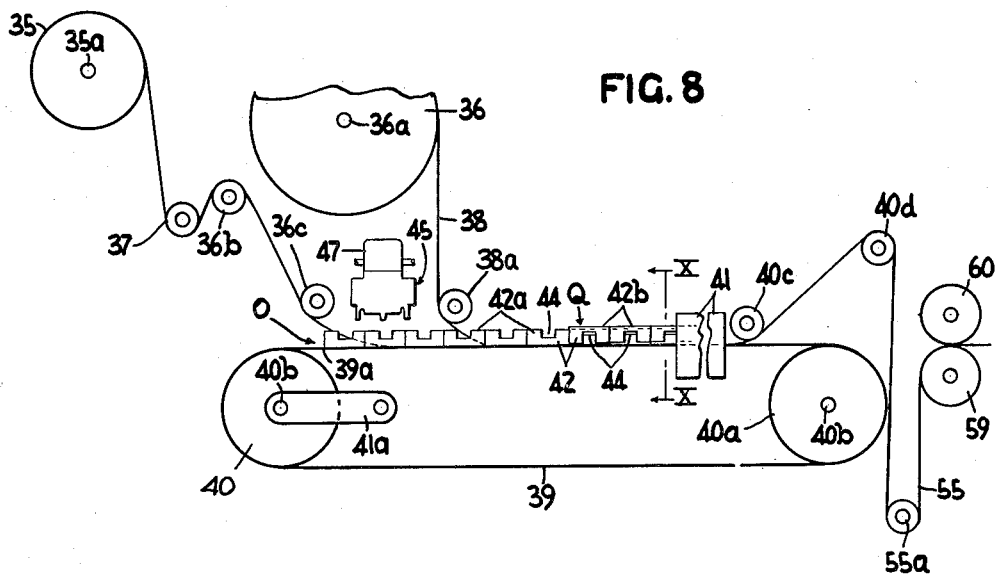
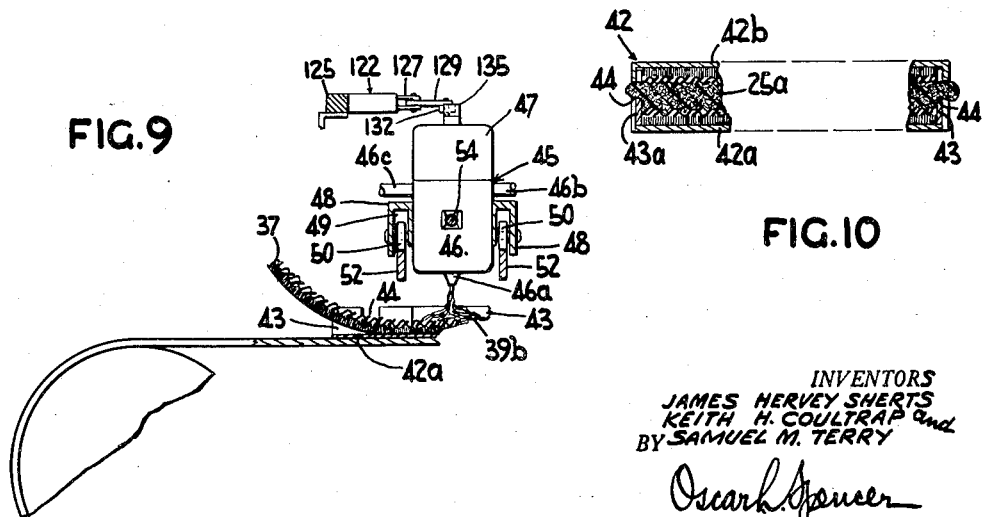
INVENTORS
JAMES HERVEY SHERTS
KEITH H. COULTRAP and
BY SAMUEL M. TERRY
Oscar L. Spencer
ATTORNEY June 26, 1962 J. H. SHERTS ET AL 3,041,224
METHOD OF FORMING FOAM LAYERS ON CARPETING
Filed Feb. 28, 1956 6 Sheets-Sheet 3

INVENTORS
JAMES HERVEY SHERTS
KEITH H. COULTRAP and
BY SAMUEL M. TERRY

ATTORNEY

June 26, 1962  J. H. SHERTS ETAL  3,041,224
METHOD OF FORMING FOAM LAYERS ON CARPETING
Filed Feb. 28, 1956  6 Sheets-Sheet 4

INVENTORS
JAMES HERVEY SHERTS
KEITH H. COULTRAP and
BY SAMUEL M. TERRY

Oscar L. Spencer
ATTORNEY

June 26, 1962   J. H. SHERTS ETAL   3,041,224
METHOD OF FORMING FOAM LAYERS ON CARPETING
Filed Feb. 28, 1956   6 Sheets-Sheet 6

INVENTORS
JAMES HERVEY SHERTS
KEITH H. COULTRAP and
BY SAMUEL M. TERRY

Oscar L. Spencer
ATTORNEY

3,041,224
METHOD OF FORMING FOAM LAYERS ON CARPETING
James Hervey Sherts, Samuel M. Terry, and Keith H. Coultrap, all of Pittsburgh, Pa., assignors to Pittsburgh Plate Glass Company, Allegheny County, Pa.
Filed Feb. 28, 1956, Ser. No. 568,336
2 Claims. (Cl. 156—79)

This invention relates to laminated bodies comprising an exposed layer of foamed resin the surface of which is formed by a slicing operation and it has particular relation to such bodies when the foamed layer is composed of a polyurethane resin.

It has heretofore been proposed to provide coatings for slabs of cellulated glass and backings for various other articles, such as webs of carpeting, rugs and other bodies by applying thereto a material adapted to adhere and foam to provide a soft, cellulated layer imparting to the web cushioning properties and increasing the friction between the web or rug and the supporting surface, such as a floor, to which such articles may be applied. In conventional processes in which a liquid, foamable material is applied to a supporting material, such as a web of carpeting or a rug, and is then allowed to foam, the free surface of the foamed material tends to form a relatively smooth, impermeable skin which is low in coefficient of friction. In many instances, it is desirable that the cellular layer be quite thin, e.g. below one half inch, for example one quarter or even one eighth inch in thickness. It is often difficult or expensive to form layers of uniform thickness of such thinness. Laying down a layer of foamable polyurethane resin of proper and uniform thickness upon a single surface is often highly difficult. This difficulty is increased if the surface to which the foam is applied is irregular.

In accordance with the provisions of the present invention, the foregoing difficulties are reduced or eliminated by filling in a liquid layer of a foamable material, such as a mixture of an aqueous emulsion of a polyester of a polyhydric alcohol and a dicarboxylic acid and an isocyanate material adapted to bridge together or to cross link the polyester molecules and to generate a gas to effect foaming thereof, between a pair of articles to be coated. The foamable material is then allowed to foam and is cured by appropriate aging assisted, if desired, by application of heat to obtain a sandwich in which the two articles are bonded together by the foam. When the foaming and curing operation is sufficiently advanced or complete, the intermediate foam layer is sliced, preferably on a median plane or such other plane in the foam as may be selected to provide two laminar structures each comprising an exposed layer, the faces of which are formed by the slicing operation and extend through the cells of the foam in such manner as to provide a vast number of open pits or craters, the edges of which are cut to a common level. Since the foam layer as formed, is usually double the thickness of the single final foam layer, difficulties of forming uniform thin layers are reduced or eliminated. Since the foams, during the soft stage, are completely covered upon both sides, it is easy to provide coverings for the sandwich which positively limit the movement of the outer layers due to expansion of the foam. The thickness of the foam layer is thus adequately regulated. In those instances in which the outer layers are of flexible material such as carpeting or the like, the surface of the latter layers may be leveled or brought to any other desired contour by enclosing the sandwich in a suitable cell during the forming stage. Even if the backs of the outer layers are irregular or non-planar, the spaces between them are completely filled with foam and by properly slicing the filling, the edges of the cut bubbles are brought to a uniform surface. The open surface cells formed by the slicing operation all have their edges in a common surface and they are all adapted uniformly to engage a supporting surface upon which carpeting, rugs or the like may be laid with considerable friction. A single slicing operation suffices to provide two open cell surfaces and no foamed resin is pared away and lost in the slicing operation.

In some instances, where it is desired to provide a sound absorbing surface, sandwiches may be built up comprising appropriate supporting material and an intermediate layer of foamed resin which is again sliced through in the manner described to provide surfaces composed of minute pockets or cells which have good sound absorbing properties.

For a better understanding of the invention reference may now be had to the accompanying drawings in which:

FIG. 7 is a sectional view of a slab of cellulated glass to which has been applied a surface of foamed polyurethane resin using the techniques previously described;

FIG. 8 is a schematic view illustrating the process of an apparatus for forming backing layers upon two continuous webs of material such as carpeting;

FIG. 9 is a fragmentary sectional view of a portion of the apparatus shown in FIG. 8;

FIG. 10 is a sectional view taken on the line X—X of FIG. 8, but for purposes of clarity, being on a larger scale;

Figure 1:
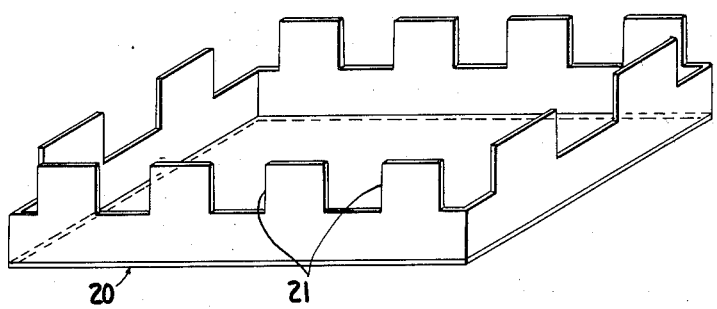
FIG. 1 is a perspective view illustating a simple embodiment of a mold or cell which may be used in forming a sandwich structure in accordance with the provisions of the present invention.

For purposes of providing an intermediate foam layer between a pair of bodies which are to be provided with surfaces of a foamed resin, an ester material of relatively high molecular weight containing a considerable number of available hydroxyls preferably is admixed with water and then with a material containing a plurality of isocyanate groups and reacted to effect the liberation of carbon dioxide and cross-linking action to convert the resin to a solid state. The techniques of effecting this reaction have been to a considerable extent elaborated upon in the prior art, for example in an article by Bayer et al., "Rubber Chemistry and Technology," vol. 23, pages 812–835, and again in an article by Stevenson, "Rubber Age," vol. 77, Number 1, pages 63 to 68.

By appropriate selection of materials entering into the reaction as well as other factors, it is possible to obtain polyurethane resin foams of a wide variety of properties. For example, the compositions may be so controlled as to obtain foams which are highly flexible and tough or which are comparatively rigid. In the preparation of a foam designed to constitute a backing for rugs, carpeting and such like articles, it is usually preferred so to tailor the foams as to obtain a considerable degree of flexibility and cushioning properties.

It is to be understood that many of the polyesters and for example those containing a relatively large proportion of hydroxyls are exceedingly reactive with many of the diisocyanates and this is especialy true after the incorporation of catalysts and water. For this reason some difficulty has previously been experienced in the preparation of the polyurethane foams owing to a strong tendency for the reactants prematurely to combine in such manner as to produce gelation before an adequate degree of mixing of the several constituents can take place. Accordingly, it is usually preferred to maintain at least a portion of the reactive ingredients in separate packages until just before it is desired to form the foams and then to mix all of the packages together to provide a reactive mixture. One package may for example comprise a hydroxy compound, catalyst and water and the other comprising diisocyanate or a diisocyanate containing material such as a prepolymer of a diisocyanate and a portion of the polyester going into the mixture. Neither package, by itself reacts, at least within a reasonable period of time, but the mixture is highly reactive. Even under these conditions it is highly desirable that the final mixing of the components involved in producing the foamed polyurethane resin be held up as long as possible and that the mixing be effected as quickly as possible and be followed immediately by distribution of the mixture in its final position in the sandwich assembly before an excessive foaming and setting reaction can occur.

FIGS. 1 through 5 of the drawings illustrate a very simple method of and apparatus for forming a composite body comprising a surface layer of a suitable material and a backing layer having a face formed by slicing through a foam constituting an intermediate layer in a three-ply sandwich structure. The two layers of material to be bonded together by foam resin and then separated by slicing through the foam layer are indicated at X and Y and comprising a base of fabric F of woven threads and a pile or nap of upstanding fibers. The layers may be formed of wool, cotton, nylon, or any other material or a mixture of two or more materials. The process and apparatus as shown may be employed to form foamed layers with surfaces of open cells upon many bodies. For example, they may be applied to forming such backings upon rugs or carpeting or upon wall board panels or upon panels of wood veneer or upon plates of glass or upon blocks or slabs of cellular glass or upon panels of steel and many other materials. For purposes of illustration, they are shown as being employed concurrently to form cellular backings upon two sheets of carpeting, which may be of rug size or other appropriate size.

As shown in FIG. 1, the embodiment of apparatus comprises a tray or cell 20 which may be of pasteboard, metal, wood, plastic such as Teflon (polyethylene fluoride), polyethylene, or other material as may be desired. In many instances, it is desirable that the inner surface of this tray be suitably coated with a material such as Teflon or other material such as polyethylene, silicone resin or the like which has but little or no adhesion with respect to the polyurethane foam. In event that the tray is formed of a non-adhesive material, the coating of the inner surface to reduce adhesion may be dispensed with.

The tray or cell is illustrated as being square in section but obviously it might also be circular or of any other desired configuration dependent upon the shape of the sandwich which is to be formed therein. It is to be noted that notches 21 are formed in the sides of the tray or cell at intervals and these constitute weep holes designed to permit the escape of any excess material as the foaming action progresses.

Figure 4:
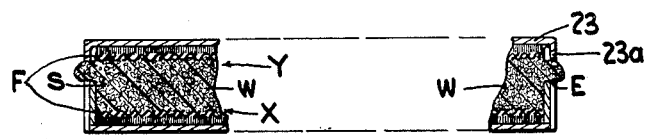

As will be observed in FIG. 4 of the drawings, the tray 20 may also be provided with a lid indicated at 23 which may be similar to the tray itself but being slightly larger so that it will fit over the tray. The sides 23a of this lid should have notches or weep holes 24 formed to register with notches 21 already discussed to facilitate the escape of excess foam material. The lid, as will be apparent in FIG. 4, functions to determine the amount of rise of the foam in the sandwich and to provide a desired surface contour upon the upper layer of the sandwich. If desired, the lid or cover section of the cell may be weighted, or it may be secured by clamps such as C clamps, or by other means which will positively prevent the foam from lifting it above predetermined height. Any further expansion by foaming action is accommodated by the notches 21 and 24 providing the weep holes already referred to.

Figure 2:
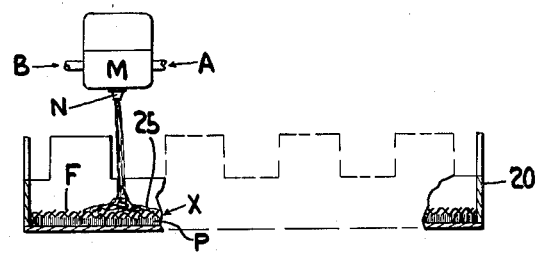
FIGS. 2, 3 and 4 are sectional views illustrating the formation of a sandwich in accordance with the provisions of this invention.
Figure 3:
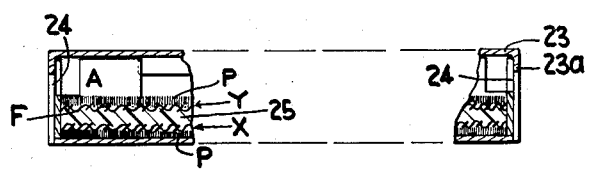

In the operation of providing a backing of foamed polyurethane resin upon articles X and Y, one of the articles, such as a sheet-like body, e.g. a rug or piece of carpeting, is placed in the tray 20 in the manner indicated in FIG. 2 of the drawings with the pile P thereof faced downwardly upon the bottom of the tray and the fabric back F thereof faced upwardly to receive the foamable mixture. The mixture of foamable material, such as a liquid polyester containing available hydroxyls, and a diisocyanate, or other material containing a plurality of available isocyanate groups in the molecule is then distributed as an appropriate layer 25. This distribution may be effected by passing an emulsion of ester material, catalyst such as N-methyl morpholine, emulsifying agent and water as one component or package A into a mixer M while passing concurrently into the mixer a stream of second component or package B of diisocyanate or an isocyanate containing material such as a prepolymer of an excess of diisocyanate and a polyester. The distribution of the mixture to form the layer may be effected by traversing the tray 20 with the article X back and forth under the discharge nozzle N of the mixer. Subsequently, the article Y is disposed upon the soft, unfoamed layer 25 with its face up.

Foaming and gelation ordinarily begin at room temperature, though in many cases the reactions are attended by an exothermal rise. The foamable mixture between the two layers X and Y gradually expands, lifting up the web Y until it touches the cover of the cell which then functions to limit further movement in an upward direction, excess foam escaping from the weep holes as at E in FIG. 4. If desired, the foaming and curing action may be promoted by placing the cells containing the sandwiches in suitable ovens and heating them in well known manner.

After the foamable mixture has attained a final, or a reasonably advanced state of cure, the cell may be opened and the sandwich S comprising layers X and Y bonded together by an intermediate foam layer W, twice as thick as the desired backing for layers X and Y, may be removed from the cell. Any excess material may then be trimmed off. Subsequently, the upper and lower portions of the sandwich are separated by slicing in an appropriate plane in the foam layer, as for example approximately midway between the two plies X and Y. This slicing operation may be performed by means of an appropriate knife, or in commercial operations, it is usually desirable to employ a mechanical splitter or slicer comprising a flexible band of steel, such as is indicated at 30, traveling about pulleys 31 one of which may be power driven. Needless to say, the edge of the band is formed with serrations or scallops designed to promote the splitting operation. Since splitters are commercial articles of manufacture, detailed description thereof is not deemed to be necessary.

Figure 5:
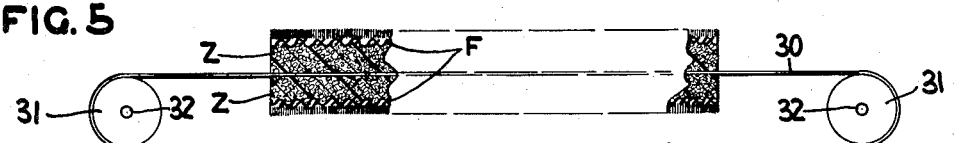
FIG. 5 is a diagrammatical view illustrating the splitting of the sandwich to provide a pair of composite bodies.
Figure 6:
FIG. 6 is a sectional view of a composite body as formed by the steps illustrated in FIGS. 2, 3, 4 and 5.

As is indicated in FIG. 5 of the drawings, the splitting instrumentality slices through the numerous cells in the plane of splitting in such manner as to form multitudinous open cells or pockets in the surface layer of the foam. The edges of the cells thus opened are all conformed to a common surface (usually a plane). The slicing operation concurrently completes two individual articles Z (see FIG. 6) each comprising a surface layer, such as carpeting with the nap uppermost and a backing U of cellular material.

It is an advantage of the present process that the foam layer can be laid down in the cell and upon the back of the layer X in an amount to provide double thickness. The subsequent splitting operation assures that the layer of foam upon the foam-backed article is of but half the thickness of the layer of foam in the sandwich before splitting. The layers X and Y give increased rigidity to the sandwich during the splitting operation thus facilitating the latter operation.

The surfaces of the foam layers comprising the open cells are characterized by remarkably high resistance to slippage even upon smooth polished surfaces, such as glass or polished floors. This resistance often substantially exceeds that of foamed rubber and other conventional backing materials sometimes employed with carpeting or rugs.

The use of a motor driven turbo mixer for intimately mixing packages or components A and B of the foam and laying the same down as layer 25 has been described. Other types of apparatus may be employed for the purpose. For example, the two components may be poured upon layer X and then commingled by agitation prior to laying down the layer Y. The two components may also be laid down and commingled by spraying them simultaneously from separate nozzle openings upon one or both of the layers X and Y. Assuming that both layers X and Y are to be coated, the spraying operation is performed and the two coated surfaces are brought together while the foamable mixture is still liquid or at least highly tacky and the mixture is foamed and cured, after which the intermediate foam layer is split apart in the manner already described to provide two separate articles having foamed surfaces.

The provision of backing layers of foamed polyurethane resin having open cell surfaces upon a fabric such as carpeting has been described. The same techniques are also applicable to the coating of other articles such as rigid slabs and panels of so-called Rocklath, wallboard, stone, concrete, glass and the like.

In FIG. 7 is illustrated a slab Xa of cellulated glass having a layer Xb of foamed polyurethane resin. A cellulated glass suitable for the purpose is known as Foamglas and is sold commercially by the Pittsburgh-Corning Corporation of Pittsburgh, Pennsylvania. This product may be prepared by pulverizing glass, mixing the powder with pulverulent carbonaceous material such as carbon black and heating the mixture to sinter the glass and to oxidize the carbonaceous material to generate gas in the sintered mass. The process is described in Long Patent 2,123,536. To form the coatings, two slabs of foamed glass may be substituted for the carpeting in the process previously described in connection with FIGS. 1 through 5. Naturally, the trays 20 and covers 23 should be of sufficient depth to accommodate the thickness of the slabs and the intermediate foam.

The apparatus as shown in FIGS. 1 through 5 is well adapted for use in the formation of sandwiches comprising definite units of limited length and width and being represented by small rugs, slabs of foamed glass, glass panels and such like articles. In event that the articles designed to receive the foam layers are of extensive length, for example when they are in the form of strips or bands of considerable, even indefinite length, it is impracticable to employ cells embodying four separate side walls as well as a top and a bottom and being designed to enclose the entire sandwich construction for complete curing in a single operation.

Figure 11:
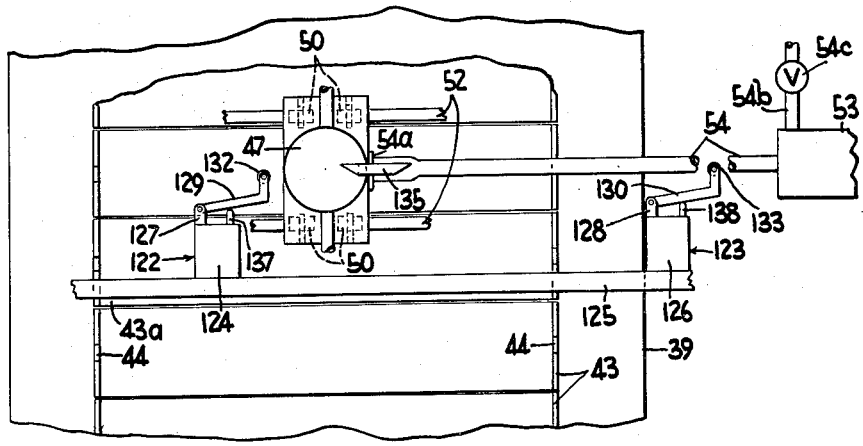
FIG. 11 is a fragmentary plan view of a portion of the apparatus as shown in FIG. 8.

One appropriate embodiment of apparatus for provision of foam surfaces upon bodies comprising long, or continuous strips of flexible material, such as carpeting, as face layers and the intermediate foam of which is adapted to be split to provide two long strips each being provided with a cellulated layer, is illustrated in FIGS. 8, 9 and 11. In this embodiment of apparatus, the flexible material is indicated as being wound up into rolls 35 and 36 upon suitable shafts 35a and 36a. Lower web 37 is drawn off from these rollers or shafts over roller 36b and then under roller 36c and deposited upon a suitable conveyor such as an endless belt 39 of steel or other flexible material mounted to travel upon two rollers 40 and 40a fixed upon shafts 40b. This belt should be of such length as to permit the foamable material between the layers 37 and 38 to foam and set to a reasonable degree while it is still thereupon. The foam need not necessarily be cured to its final stages, since the sandwich when reasonably set, can be cured in a separate oven; needless to say, a part of the conveyer length could also be enclosed in a tunnel-like oven 41 for promoting the cure, if so desired. Some of the polyurethanes will also set to their final state without heating, if allowed enough time.

The apparatus includes means to advance the belt 39 periodically or continuously as required. Such means may comprise automatic motor actuated means either to index the belt forwardly as required, or continuously to drive the belt at the appropriate speed. For purposes of illustration the means is shown as comprising a hand operated crank 41a which may be rotated by an attendant as required.

Means to encase the sandwich during the stages of foaming and setting as it is laid up upon the belt 39 comprises mold sections 42 shown in FIG. 10 having bottom and top portions 42a and 42b. Upon two opposed edges these sections are formed with side walls 43 and 43a, the side walls of the bottom being designed to nest into the side walls of the top. Also the edges of the side walls are formed with notches adapted to provide weep holes 44 in the manner already described to permit the escape of any excess of foamable material at the sides of the web. These side walls are so spaced as to straddle the sandwich being formed and the end walls are omitted to permit the continuous strip of sandwich to extend continuously through the sections. The top 42b, if desired, may be formed of material, such as metal, having sufficient weight in order to assure that the layer of the foamable materials in the intermediate layer 25a between the two webs 37 and 38 will not expand or rise beyond predetermined limits. Appropriate clamps or clips adapted to clip over the edges of the cells could also be employed for the same purpose.

As illustrated in FIG. 8 of the drawings, means to mix two packages or components designed to form by their mixing a foamable and setting composition is provided at the end of the conveyor contiguous to the rolls 35 and 36. To this end, the rear portion 39a of the upper reach of the conveyor 39 provides a loading apron; the roll 36 being disposed to discharge layer 39b substantially forwardly of the rear end of the conveyor. Turbo mixer apparatus 45 is disposed above the apron portion of the conveyor belt and comprises a mixer section 46 having a discharge nozzle 46a and a driving motor 47 designed to actuate the latter. Hose connections 46b and 46c supply components A and B to the mixer in proper proportions. The mixer is supported by side brackets 48 having downwardly facing slots 49 formed therein, within which are journaled rollers 50 traveling upon transverse guide rails 52 which are supported slightly above the conveyor belt 39. Preferably the rollers are paired two upon a side.

The mixing apparatus may be reciprocated back and forth across the upper reach of the conveyor as for example manually or by any convenient mechanical device such as an air cylinder 53 (shown in FIG. 11) fixed upon any convenient support and being provided with a piston rod 54 attached to a suitable bracket 54a upon mixer 46 so that reciprocation of the piston reciprocates the mixer transversely of the conveyor 39. A slide valve or other appropriate device (not shown) automatically controls the reciprocation of the piston. A pipe 54b having valve 54c supplies air under pressure to the cylinder.

In the operation of this apparatus, the lower portion 42a of a mold section is disposed upon the apron as indicated at O with the side walls 43 and 43a up and with the web 37 trained thereover between the said side walls. The section may then be advanced as for example by rotating the crank 41a to a position so that the rear edge thereof is disposed directly below the nozzle 46a of the turbo mixer 45. The mixer is then reciprocated backward and forward by the piston rod 54 while the conveyor belt is advanced in increments corresponding to the width which can be covered by a single transverse line of the interpolymerizable mixture as it is discharged from the nozzle thus laying down a layer of foamable mixture. As the conveyor is advanced to such point as substantially to dispose the rear edge of the mold section under the nozzle, a second bottom mold section is disposed upon the apron portion of the conveyor belt at the position O and the several operations are repeated in order to lay down a layer of foamable material upon the section of the web 37 in the latter mold section. A continuous layer of foamable material is thus laid down.

As the bottoms of the mold sections advance upon the conveyor beyond the turbo mixer, web 38 is brought down from the roll 36 to provide the upper layer of the sandwich. This operation is assisted by roller 38a (see FIG. 8). Subsequently, at a point Q, the upper or top portion 42b of the mold section or cell is disposed in position. The several sections containing the sandwich are allowed to travel along on the conveyor belt for a period sufficient to allow the interpolymerizable mixture to foam to the full extent thus filling out each section in the manner indicated in FIG. 10.

For purposes of curing the foamable mixture to its final non-tacky but flexible state, the conveyor belt may be extended through an oven (such as 41) where heat is applied in order to expedite the final cure. After the plastic has foamed and sufficiently set, the sandwich is trained under roller 40c and over roller 40d. The mold sections may be removed manually and the strip sandwich comprising the upper and lower layers with the intermediate layer of foam drops off the end of the conveyor. Conveniently, a portion 55 is allowed to form a loop or festoon about idler roller 55a thus allowing for the intermittent advancement of the web. In a continuous operation, the web could go straight into the oven.

Final curing of the polyurethane foam in the continuous sandwich may be effected in an oven 56 (see FIG. 12) which is heated by appropriate means, for example by heated gases introduced through a flue or conduit 57 and being drawn off through a flue or conduit 58. Other means of heating obviously might be supplied. Lifting of the sandwich from the conveyor belt 39 preferably is delayed sufficiently long to permit the foamable mixture to reach a degree of set that will admit of the sandwich being bent without breakdown of the cells of the foam. Such setting occurs in a few minutes, e.g. 5 to 20 minutes. The web of sandwich indicated in the drawings is drawn up from the loop or festoon 55 and fed to the oven by means of appropriate continuously driven rollers 59 and 60 which are operated at such speed as to maintain the loop of reserve web 55.

The complete curing of the foamable material in the strip sandwich may require a substantial period of time, for example an hour or even more, and for purposes of admitting of this period of travel in the oven without excessively extending the length of the latter, means is provided for looping the strip backward and forth in the oven. Such means comprising spaced series of rollers 62 and 63 with intermediate supporting bars such as are indicated at 64. In those instances where a high curing temperature, e.g. 250° F. or 300° F. is employed, a relatively short curing time is permissible. In that instance, a straight run through the oven is feasible.

Figure 13:
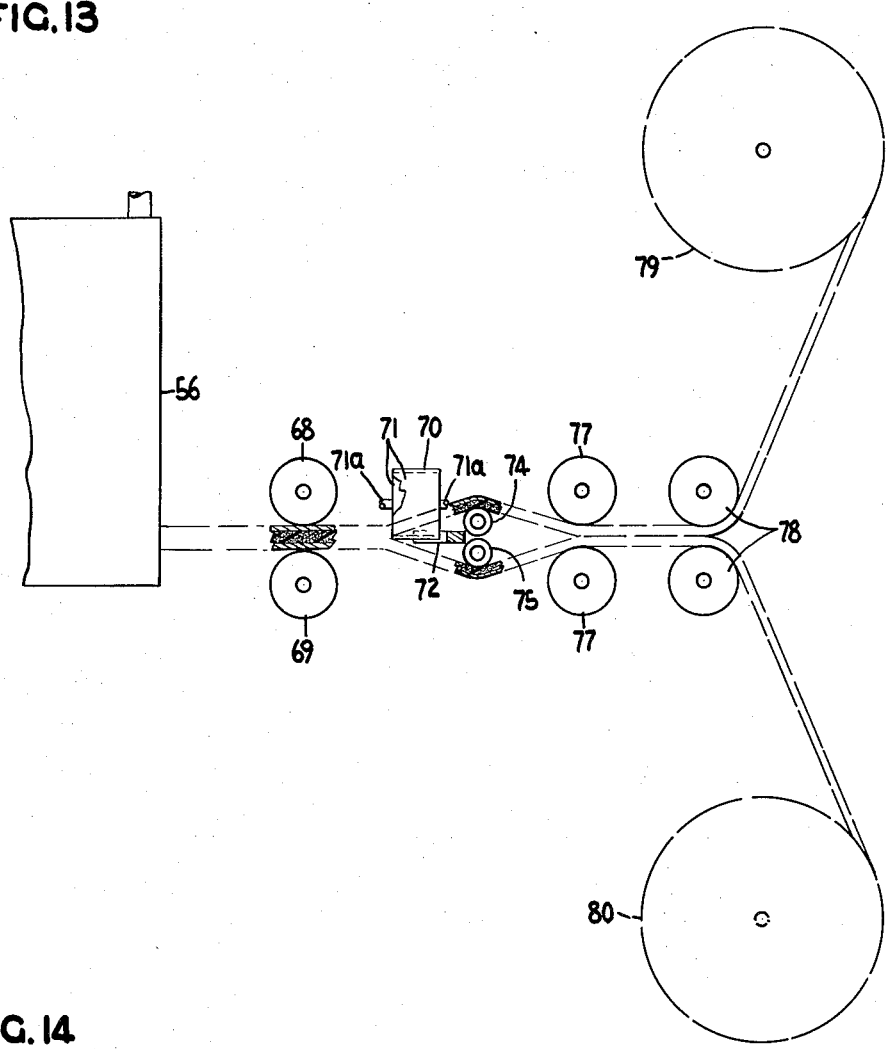
FIG. 13 is a diagrammatic view of a splitting apparatus suitable for use with the apparatus of FIG. 8.

The three-layer sandwich, as a strip or web, is drawn off through an opening or slot 66 near the bottom of the oven, the drawing being effected for example by continuously driven rollers 68 and 69. The sandwich, after it emerges from the oven, may pass on to a suitable take-up roller for winding up in a compact form convenient for storage or, if preferred, it may be passed directly to a suitable slicing or splitting apparatus such as is illustrated diagrammatically in FIG. 13 of the drawings. In this apparatus, the rollers 68 and 69 engaging opposite sides of the sandwich strip function as positioning rollers for the splitting mechanism to be described.

A slicer or splitter comprising a flexible band 70 of steel or other appropriate material is disposed forwardly of the positioning rollers 68 and 69 and it is provided along one edge with serrations or scallops not shown and is also beveled to a cutting edge. This band is mounted upon suitable driving rollers 71 similar to those of a conventional band saw, upon shafts 71a. The back of the splitter or slicer band travels in a groove in a guide bar 72 which is rigidly mounted to maintain the band in fixed position with respect to the positioning rollers 68 and 69. Rollers indicated at 74 and 75 are also disposed to separate the upper and lower plies as they are split apart by the band 70. By thus separating the sections, tension is placed along the line of cutting whereby to facilitate the splitting action. The cut surfaces are again squeezed by rollers 77 and 78 thus holding the laminations from vertical vibration on each side of the splitter.

Finally the two plies, each being provided with a layer of foamed polyurethane resin, are wound up on the take up rollers 79 and 80 for storage or for subsequent treatment as may be required.

In many instances, the strips as thus obtained may require cutting into sections of desired length for specific application.

The webs of carpeting indicated in the drawings may obviously be replaced by other flexible webs such as cloth, building paper, Bristol board, burlap or the like.

Figure 14:
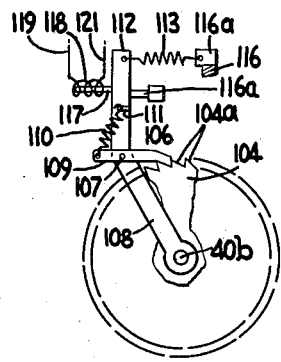
FIG 14 is a diagrammatic view of an indexing mechanism for advancing the webs incrementally in the apparatus of FIG. 8.

Reference has been made to the manual rotation of roller 40 to advance the conveyer 39 in increments or steps as the foamable material is laid down, thus assuring that each strip as laid down during the reciprocation of the turbo mixer will be parallel to the preceding strip. Means to perform this operation automatically is shown in FIG. 14. This mechanism may be substituted for crank 41a, or if desired, the crank and mechanism may be included on the same roller and may be used selectively at the will of the operator. Mechanism to obtain this result is illustrated as comprising a ratchet wheel 104, having teeth 104a, which is fixedly mounted upon the shaft 40b of the roller 40 and which is engaged by a pawl 106 pivoted at 107 upon an arm 108 rotating on shaft 40b. The pawl includes a rearwardly extending arm 109 which is attached by a tension spring 110 to a lug 111 upon a bracket portion 112 constituting an extension of the arm 108. The tension spring operates to hold the pawl 106 in normal engagement with the ratchet teeth 104a. Means to hold the arm 108 normally in forward position comprises tension spring 113 attached at one end to the bracket portion 112 and at the other end to any convenient fixed support as indicated at 116. A buffer bar 116a on support 116, limits the backward movement of arm 108 by the tension of the spring 113. Means to reciprocate the arm 108 against the tension of the spring 113 comprises an armature 117 fixed upon the bracket portion 112 and extending into a solenoid coil 118 having leads 119 and 121 to a source (not shown) of electrical current.

Means to control the flow of electricity to the solenoid coil 118, as shown in FIG. 11, comprises a pair of normally open electrical switches such as the microswitches indicated diagrammatically at 122 and 123 on a bar 125 and comprising switch bodies 124 and 126 with posts 127 and 128 having switch arms 129 and 130 attached thereto with rollers or pads 132 and 133 upon the upper extremities thereof in position to be engaged by a projection 135 on motor 47, as it reciprocates near the ends of its strokes. Switch actuators 137 and 138 extending upwardly from the switch bodies 124 and 126 are engaged by arms 129 and 130 so that when the latter are engaged by the bracket 135, the switches are closed to energize the solenoid. It will be apparent that at the conclusion of each transverse movement of the mixer mechanism, one of the switches 124 or 126 is closed by bracket 135 to complete the circuit of the normally opened switches energizing the solenoid coil 118 to pull back the arm 108. When the turbo mixer mechanism starts its return movement, the switch is disengaged, thus opening the circuit and de-energizing the solenoid. Tension spring 113 pulls the arm 108 forward whereby to cause the pawl 106 to advance the ratchet wheel one space. The movement of the ratchet wheel rotates the shaft 40b and in turn rotates the roller 40 to advance the conveyor belt 39 an increment corresponding to the width of the strip of foamable material laid down by the nozzle 46a. The conveyer then remains stationary until the mixing mechanism has completed its reverse stroke when the bracket 135 engages the second switch again to retract the arm 108. The conveyer is advanced in increments or steps continued so long as the mixer is reciprocated. A substantially uniform layer of foamable material is thus laid down upon the back of the web material 37.

Figure 15:
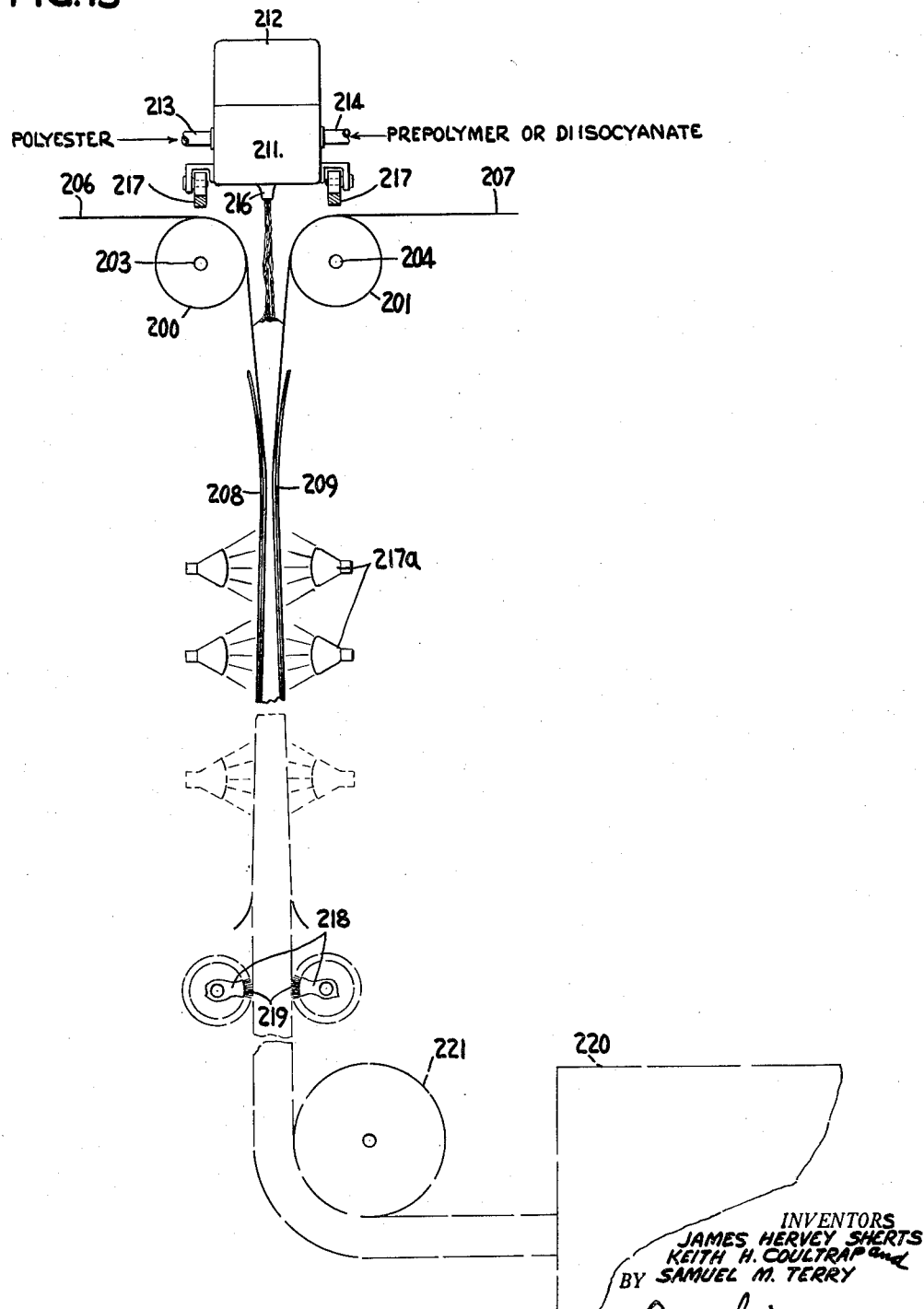
FIG. 15 is a diagrammatic view of a further embodiment of apparatus for coating webs of flexible material.

In the apparatus as shown and previously described, for concurrently coating two continuous or elongated strips or webs of flexible material such as carpeting, the three layer sandwich is illustrated as being carried forwardly upon a horizontal conveyer belt. It is also to be understood that the principles of the invention are applicable to the formation of a foamed polyurethane bonding layer between two strips or webs traveling vertically in contiguity to each other as shown in FIG. 15. An appropriate embodiment of apparatus for so treating the webs comprises a pair of appropriately spaced, parallel-horizontal rollers 200 and 201 having projecting end shaft portions 203 and 204 mounted in journals (not shown). Webs or strips of flexible material, such as carpeting, 206 and 207 from a suitable source of supply are drawn over the rollers and directed downwardly in such manner that the upper portions thereof are spaced with respect to each other but the portion below the rollers are slightly convergent. Below the rollers are disposed a pair of shoes 208 and 209 which contact with the faces of the strips 206 and 207 in such manner as positively to regulate the spacings between the two strips. It is desirable that the shoes converge slightly at their upper portions in order to assure that the two webs will be approximately in contiguity with respect to each other at the upper portion of the shoes.

Means to feed between the webs a foamable mixture such as a mixture of a polyhydroxy ester and a material containing a plurality of isocyanate groups, comprises a turbo mixer such as is indicated diagrammatically at 211 and a driving motor 212. One component or package of the foamable mixture, such as an aqueous emulsion of a polyester of the type already described, is fed into the mixer through a hose connection as indicated at 213 while the other components such as a non-aqueous material containing multiple diisocyanate groups is fed through a second hose connection 214. The thoroughly commingled components of the foamable mixture of the two components are discharged from the bottom of the mixer through a nozzle as indicated at 216. If desired, the motor and mixer may be reciprocated manually or mechanically upon tracks 217 in the manner already described in connection with FIGS. 8, 9 and 11. Repetition of the description, it is believed, would be superfluous at this time.

The foamable mixture is allowed to flow downwardly between the convergent portions of the two strips 206 and 207. The upper portions of the two shoes 208 and 209 may be so spaced with respect to each other that the mixture is slightly dammed up or retarded above the point of nearest approach of the two webs with respect to each other. In this manner, it is assured that the backs of both strips or webs will be fully coated with the foamable mixture. After the web passes between the points of approach between the two, they are conducted gradually divergently with respect to each other in contact with the faces of the opposed shoes so that as they travel downwardly and the foamable material foams and sets. The foaming and setting reaction may be promoted by heat applied for example by radiant heaters 217a. The run between shoes 208 and 209 should be extended far enough to assure that the foam can be flexed to a substantial degree without rupturing the cells, before the sandwich leaves the shoes. Space is provided for the increase in volume. In this embodiment of apparatus, the advance of the two strips or webs in steps, as for example by means of the ratchet mechanism previously described, is not required.

Means to draw the web downwardly between the shoes may comprise roller 218 which may be driven by motor means (not shown) at desired speed. These rollers may be provided with suitable friction surfaces, as for example with short wire teeth 219 designed slightly to dig into the strips or webs 206 and 207 to obtain adequate grip to pull them between the shoes.

Figure 12:
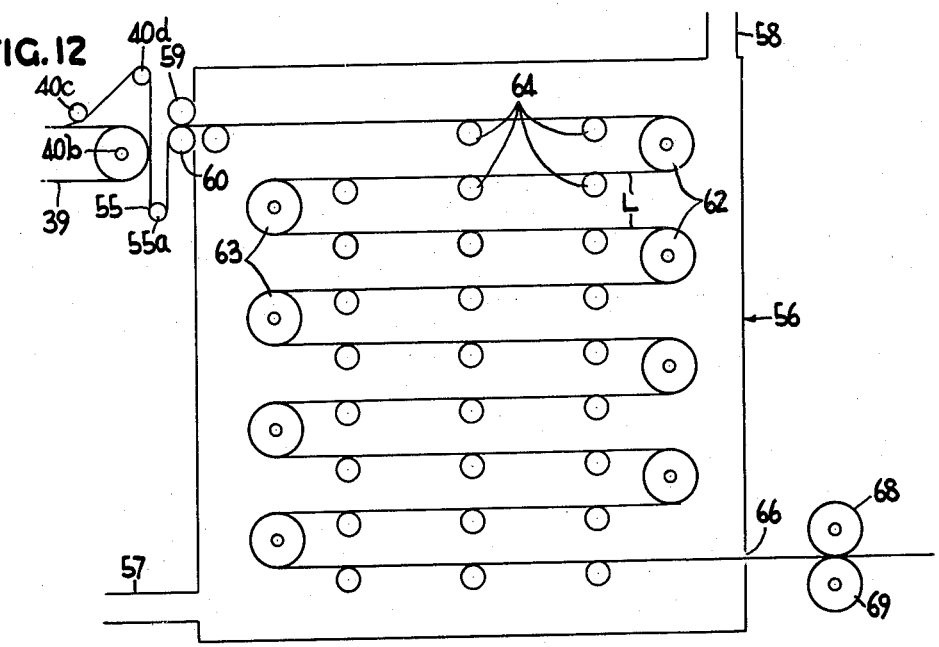
FIG. 12 is a diagrammatic view of a curing apparatus for use with the apparatus of FIG. 8.

After the foamable polyurethane resin mixture has sufficiently foamed and set to obtain substantial permanency of thickness, the web may be conducted through a suitable curing oven of a type similar to that already described in connection with FIG. 12. This oven may be so disposed as to conduct the web continuously vertically, though, for purposes of illustration, it is indicated as being horizontal as at 220. In order to conduct the strip-like sandwich into the oven, after the foam has set to an adequate degree, the sandwich is bent around an appropriate roller 221 to a horizontal position. The web, after passing through the oven, is drawn off through a splitting mechanism designed to split the three layer sandwich in the plastic layer to provide two separate units in the manner already described in connection with FIG. 13. The splitting mechanism may be identical with that already described. Further repetition of the description of the later mechanism is at this time deemed to be unnecessary and for purposes of brevity, has been omitted.

Figure 16:
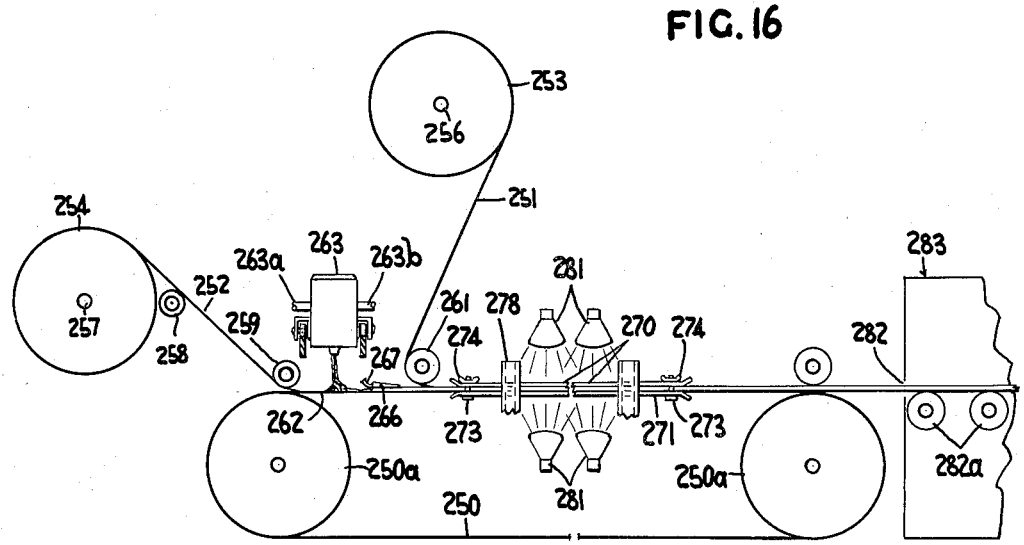
FIG. 16 is a diagrammatic view illustrating a further embodiment of apparatus suitable for use in practicing the invention.
Figure 18:
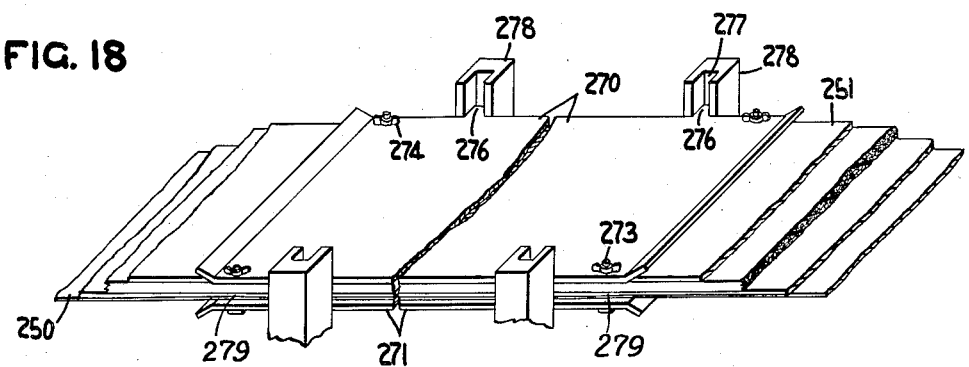
FIG. 18 is a fragmentary perspective of gauging plates for use with the apparatus as shown in FIG. 16.
Figure 17:
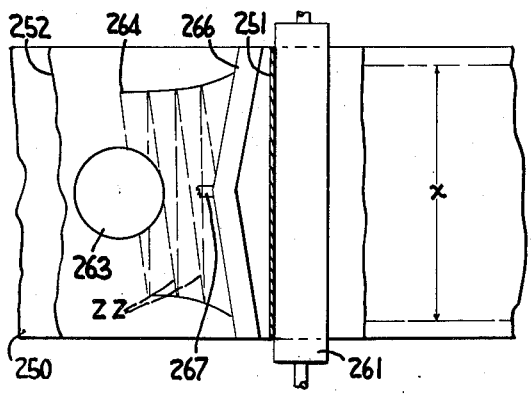
FIG. 17 is a fragmentary plan view of a portion of the apparatus as shown in FIG. 16.

In the form of the invention as illustrated in FIGS. 16, 17 and 18, a conveyor belt 250 upon continuously driven rollers 250b is provided for supporting and carrying a sandwich of flexible webs 251 and 252 of carpeting, fabric, paper or the like material, which may be supplied from rolls 253 and 254 upon shafts or rollers 256 and 257. Web 252 constituting the bottom web is drawn over roller 258 and under roller 259 and deposited face down upon the upper reach of the conveyor belt while the web 251 is drawn under the roller 261 and laid down face up upon the sandwich as it is formed.

Foamable mixture is laid down upon the rear portion 262 of the web 252 which is in contact with the upper reach of the belt. Appropriate means for laying down such mixture comprises a transversely reciprocating mixing device 263 having inlets 263a and 263b for components A and B of the foamable mixture. The mixer may be the same as or similar to the mixer apparatus illustrated in FIGS. 9 and 11 of the drawings. Reference may be had to the discussion of the latter figures for a more complete understanding of the apparatus shown at 263 in FIG. 16. As shown in FIG. 17, the mixer does not necessarily traverse the entire width of the web 252 but may stop at some intermediate point as at 264. The mixing may also be performed externally by discharging components A and B through separate spray nozzles upon the surface.

It will be appreciated that the conveyor belt 250 may be driven intermittently in steps of suitable length, as is belt 39 in FIG. 8. It may be stationary during the time in which the mixer 263 is in travel across the width of the web. In the latter event the foamable material is laid down on the web 252 in parallel strips. However, it is to be understood that if desired, the belt may be continuously driven in which event the material is laid down in a zigzag path as indicated in broken line at Z—Z. For purposes of obtaining uniform distribution of the zigzag strip of the foamable mixture from the traveling mixer 263, a suitable spreader bar or doctor blade indicated at 266 may then be provided. This blade may be a simple knife-edge device designed to effect uniform distribution of the material across the web by mechanical contact, or if preferred, an air blade of hollow construction having a hose connection 267 for discharging air into the blade, may be provided. Such blade preferably is provided with a slot at or near its edge designed to produce a smoothing action by reason of the blast of gas traveling at a slight angle with respect to the surface of the web. By use of a doctor blade, foamable liquid laid down in a zigzag trace back and forth across the web may be smoothed out. The smoothing action also tends to propel the foamable material laterally towards the edges of the bottom web of flexible material, thus permitting the limitation of the transverse movement of the mixer back and forth across the web to minimum distance. It will be apparent that the doctor blade may also be of V shape as indicated in FIG. 17 for purposes of assisting in propelling the material toward the edges of the web or strip. It is within the scope of the invention to use a mixer which is fixed in position and to rely primarily upon the spreading action of the blade to obtain a uniform layer across the web. Needless to say, the weight of the web 251 will assist in spreading the soft mixture of foamable material.

Means accurately to gauge the thickness of the three layer sandwich as it travel along on the conveyer belt 250 is indicated as comprising a pair of spaced gauge plates 270 and 271 which are adjustably held together by means of through bolts 273 having wing nuts 274 by means of which the spacing of the plates can be adjusted with accuracy. The plates are held from longitudinal movements by means such as lugs 276 disposed to slide in slots 277 in fixed posts 278. The plates are urged to spaced relationship with respect to each other by means of suitable springs 279 upon the through bolts 273. It will be observed that the lower plate 271 is disposed to contact with the lower face of the belt thus accurately supporting the latter throughout its width. The plates function to limit the rise of the foam thus providing a sandwich of uniform thickness. If desired, the rear edge of the plate 270 may be maintained a little space above the face of web 251. Contact between the latter web and the plate will then occur only as the web approaches the limit of its travel under the plate. Minimum frictional drag upon the web is thus assured.

The plates 270 and 271 preferably are of adequate length to permit the foaming material between the webs 251 and 252 to become sufficiently set while traveling between the plates that the dimensions of the sandwich will be accurately maintained during the subsequent operations.

If desired, the curing of the sandwich between the plates may be expedited by heating means illustrated as heating lamps 281 disposed above and below the conveyer. The lamps obviously may be replaced by any other appropriate means for heating the two plates.

The sandwich web after it leaves the conveyer 250, may be conducted through slot 282 and over rollers 282a in an oven 283 for the final curing operation. The cured sandwich is withdrawn from the oven and may be split by means of an apparatus such as splitter indicated in FIG. 13 of the drawings.

It will be appreciated that it is usually desirable to trim the edges of the webs accurately to transverse dimensions, for example, by cutting of the margins to the lines X. This operation conveniently may be performed after the cured sandwich strip, as illustrated in FIG. 16, has been split to provide two webs having appropriate backing layers of foam material.

In the provision of bodies having foam coatings of polyurethane resins, suitable for forming foamed coatings upon various bodies by the techniques and apparatus herein disclosed, various compounds containing a plurality of hydroxyls and various compounds containing a plurality of isocyanate groups may be employed respectively in components A and B. Polyesters of dicarboxylic acids and an alcohol containing a plurality of hydroxyls are especially well suited for use as the hydroxyl containing component. The polyesters may be of saturated dicarboxylic acids such as adipic acid, succinic acid, phthalic acid and the like (or mixtures thereof) and glycols such as propylene glycol, diethylene glycol or the like. Often some polyhydric alcohol such as glycerol, trimethylol ethane, or the like will be included.

The isocyanate component may comprise one or more components such as:

2,6-tolylene diisocyanate
2,4-tolylene diisocyanate
p-Phenylene diisocyanate
Diphenylene 4,4'-diisocyanate
Hexamethylene diisocyanate and others. It has been found that 2,4-tolylene diisocyanate and mixtures thereof with about 10 to 40 percent of 2,6-tolylene diisocyanate are very useful. Good commercial grades of these materials are sold as Mondure TD and Hylene TM.

The isocyanate may be kept separate from the polyester component until it is desired to use them in forming a sandwich and in that condition are reasonably stable. However, when they are to be used, water in small amount is added to the polyester along with a surfactant such as a well-known anionic, cationic or nonionic surfactant or a blend thereof designed to promote emulsification of the several components. A catalyst of reaction for the isocyanate such as a tertiary amine, e.g. N-methyl morpholine or N-dimethyl ethanol amine is added. Finally, the mixture as component A is mixed with diisocyanate or prepolymer. This final mixing is effected by spraying the diisocyanate-containing component (B) and the polyester-containing component (A) through separate nozzles upon a common surface, or preferably by agitating them together in a mixer such as is indicated in the drawings (FIGS. 2, 8, 15 and 16). They are then quickly run out and spread as the foamable interlayer of the sandwich.

The several components may be approximately in the following ranges:

| | Parts by Weight | (Preferable) |
|---|---|---|
| Hydroxyl containing Resin | 100 | 100.0 |
| Emulsifier | 0.1–10 | 2.0 |
| Catalyst | 1.2–5 | 1.0 |
| Water | 1.1–5 | 2.5 |
| Diisocyanate | 20–100 | 30 |

The following example is illustrative of the preparation of a typical polyhydric compound and the manner in which the latter is mixed with water, catalyst, surfactant and diisocyanate to form a foam.

*Example 1*

A polyester, which with a diisocyanate, reacts to form a flexible foam was prepared from the following components:

| | |
|---|---|
| Adipic acid | 16 moles. |
| Diethylene glycol | 18 moles. |
| Glycerine | 1 mole. |
| Catalyst of esterification (tolylene sulfonic acid) | 0.1 percent based upon the mixture. |

This mixture was reacted in conventional manner by heating the mixture to evolve water until the acid value was reduced to a value of less than 12 and until a hydroxyl value of 60 to 80 was obtained. This aqueous emulsion of the polyester is well adapted to react with a diisocyanate to form a flexible foam upon cellular glass or other rigid backings.

An appropriate isocyanate material for blending with this polyester emulsion comprises tolylene diisocyanates, such as is sold under the trade name of Mondure-TD or Hylene-TM. Various tertiary amines may be employed as catalysts, though one of the more satisfactory, as thus far obtained, comprises N-methyl morpholine.

If desired, the diisocyanate may be reacted with a portion of the polyester component of the interpolymerizable mixture to provide a so-called prepolymer. This reaction preferably is effected in the substantial absence of water and may be performed in the presence or absence of catalysts of interpolymerization. The interpolymer as thus obtained may then be blended with additional polyester emulsified with water, or containing a hydrating agent. An appropriate prepolymer composition may be formulated as follows:

| | Parts by weight |
|---|---|
| Polyester (same as described) | 100 |
| Tolylene diisocyanate (Mondure-TD) | 150 |
| N-methyl morpholine | 2 |
| Emcol H-77 (surfactant) | 2 |

This mixture will react at room temperature or the reaction may be expedited by moderately heating to form the prepolymer. This prepolymer is a liquid and will stand for long periods of time without undue thickening. The prepolymer so formulated may be component B of a foamable mixture. An appropriate polyester mixture which may be package A and as such can be mixed with package B may be formulated as follows:

| | Parts by weight |
|---|---|
| Polyester (as above described) | 100 |
| N-methyl morpholine | 5 |
| Emcol H-77 (emulsifying agent) | 2 |
| Water | 1-2 |

Components A and B as above prepared may be fed to the mixers as illustrated in the drawings and spread as layers upon the bottom layers shown. Subsequently top layers are applied, the sandwich is foamed and cured and then split as described to provide two foam coated articles.

This example is illustrative; other foamable mixtures may be substituted therefor.

In the embodiments of the apparatus as shown, the two components of the foamable mixture are laid down as a solid stream or as solid streams upon the webs which are to be sandwiched together by the foams. It will be apparent that the mixtures may be mixed with air and discharged under pressure through spray nozzles upon one or both of the webs. The webs may then be pressed together and cured to provide a three layer sandwich which can be split apart by slicing through the foam layer in the manner already described. If preferred, the two packages (A) and (B) of the foamable mixture can be sprayed through separate orifices or nozzles upon a common surface in accordance with the disclosure of commonly owned Reis application, Serial Number 522,928, filed July 19, 1955, now issued as Patent 2,779,689. The components are thus mixed as they strike the surface. The necessity of reciprocating the feeding mechanism for laying down the foamable mixture may thus be obviated. In event that traveling webs to be coated are wide, a plurality of spray nozzles may be spaced across the width of the webs.

The Emcol H-77 which is the surfactant in the above entitled composition is a balanced blend of higher carboxylic acid esters of polyoxy ethylene and a polyhydric alcohol and of partially sulfonated alkyl and aryl derivatives. Emcol H-77 may be replaced by Tween-60 which is a commercial surfactant understood to be a reaction product of sorbitan monostearate and ethylene oxide, or Tween-40 which is understood to be polyoxyethylene sorbitan monopalmitate. Other commercial surfactants may also be used.

We claim:

1. The method of concurrently providing two flat pieces of carpeting with backing layers of foamed polyurethane resin, said layers both having open celled faces of high coefficient of friction, which comprises spreading upon the back of one of the layers, a layer of liquid, foamable mixture comprising 100 parts by weight of a polyester of a saturated dicarboxylic acid and a dihydric alcohol, said polyester being of a hydroxyl number of about 60 to 80 and an acid number below 12; about 20 to about 100 parts by weight of tolylene diisocyanate; about 0.1 to about 5 parts by weight of water; 0.1 to 10 parts by weight of an emulsifying agent; and 0.2 to 5 parts by weight of a tertiary amine, which is a catalyst of the reaction of the polyester and the tolylene diisocyanate to form polyurethane resins; applying the second piece of carpeting with the back thereof in contact with the foamable mixture, allowing the mixture to foam and cure, while limiting the separation of the two pieces of carpeting to predetermined distance and then slicing the foamed and cured layer apart in a plane intermediate of the pieces of carpeting to provide two units, each having a non-slip back of foamed polyurethane resin formed in situ thereupon, the back being of a thickness of about ⅛ inch to about ½ inch and the cells in the face being opened by the splitting operation and having edges in a common plane.

2. In a method of providing a backing of flexible, foamed polyurethane resin of a thickness of about ⅛ inch to about ½ inch upon two flat pieces of carpeting, the steps of laying a first piece of carpeting face down in a tray-like container, applying to the back of the piece a layer of a foamable mixture of a polyhydric material, water and toluene diisocyanate, laying face up upon the top of the foamable mixture a second piece of carpeting, whereby to form a three-layer sandwich, placing upon the container a lid spaced from the upper face of the latter piece of carpeting a distance equal to the combined thicknesses of the backings and providing an upper limit to the degree of separation of the pieces of carpeting when the mixture foams, foaming the mixture to effect separation of the pieces and to bring the upper face of the second piece into contact with the lid, weeping out excess foamable mixture at the edges of the sandwich, curing the mixture to provide an intermediate layer of foamed urethane resin directly adherent to the two pieces of carpeting and splitting the foamed layer in an intermediate plane thereof, whereby to obtain said two pieces of carpeting, each having a backing layer of a thickness of about ⅛ inch to about ½ inch of foamed polyurethane resin, said layers having the faces thereof formed of open cells, the edges of the open cells being in a common plane by reason of the splitting operation.

References Cited in the file of this patent

UNITED STATES PATENTS

| | | |
|---|---|---|
| 1,696,129 | Silver | Dec. 18, 1928 |
| 2,639,252 | Simon et al. | May 19, 1953 |
| 2,641,296 | Marco | June 9, 1953 |
| 2,642,920 | Simon et al. | June 23, 1953 |
| 2,785,739 | McGregor et al. | Mar. 19, 1957 |
| 2,841,205 | Bird | July 1, 1958 |

FOREIGN PATENTS

| | | |
|---|---|---|
| 406,697 | Great Britain | Feb. 26, 1934 |
| 624,113 | Great Britain | May 27, 1949 |
| 805,708 | Germany | May 28, 1951 |
| 842,267 | Germany | Sept. 15, 1952 |

UNITED STATES PATENT OFFICE
CERTIFICATE OF CORRECTION

Patent No. 3,041,224                                        June 26, 1962

James Hervey Sherts et al.

It is hereby certified that error appears in the above numbered patent requiring correction and that the said Letters Patent should read as corrected below.

Column 11, line 49, for "travel" read -- travels --; column 12, in the table, second column, line 3 thereof, for "1.2-5" read -- 0.2-5 --; same table, second column, line 4 thereof, for "1.1-5" read -- 0.1-5 --; column 16, after line 1, insert the following:

2,826,244    Hurley-------------Mar. 11, 1958 same column 16, after line 2, insert the following:

2,845,997    Waite-----------Aug. 5, 1958

Signed and sealed this 3rd day of December 1963.

(SEAL)
Attest:

ERNEST W. SWIDER
Attesting Officer

EDWIN L. REYNOLDS
Acting Commissioner
of Patents